I. LADOFF.
ARC LIGHT ELECTRODE.
APPLICATION FILED NOV. 27, 1911.
1,164,728.
Patented Dec. 21, 1915.
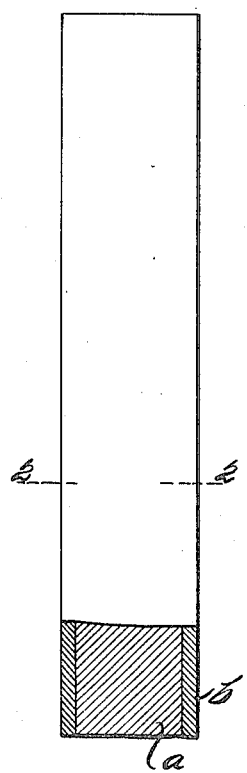
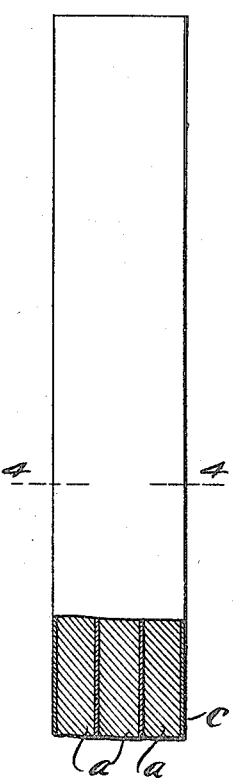
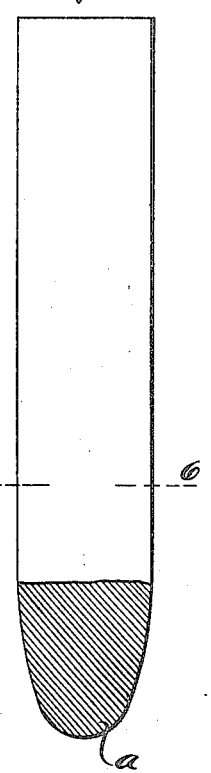
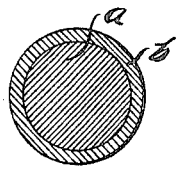
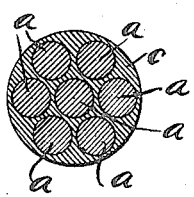
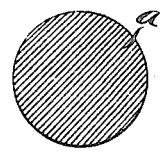
Witnesses:
C. A. Jarvis
George R. Measures.
Inventor
Isador Ladoff.
By Walter D. Edmonds.
Attorney

UNITED STATES PATENT OFFICE.

ISADOR LADOFF, OF CLEVELAND, OHIO, ASSIGNOR, BY MESNE ASSIGNMENTS, OF THIRTY ONE-HUNDREDTHS TO WALTER D. EDMONDS, OF BOONVILLE, NEW YORK.

ARC-LIGHT ELECTRODE.

1,164,728.      Specification of Letters Patent.      Patented Dec. 21, 1915.

Application filed November 27, 1911. Serial No. 662,558.

*To all whom it may concern:*

Be it known that I, ISADOR LADOFF, a citizen of the United States, and a resident of Cleveland, in the county of Cuyahoga and State of Ohio, have invented certain new and useful Improvements in Arc-Light Electrodes, of which the following is a specification.

My present invention relates to so-called "flaming" arc electrodes of the type composed essentially of so-called mineralized carbon, these being, loosely speaking, electrodes composed largely, in fact usually preponderatingly, of carbon with which has been associated various mineral substances to increase candle-power efficiency, etc., such association imparting, to an extent, to the resulting arc the said "flaming" and other characteristics incidental to electrodes composed principally of metallic substances as distinguished from carbon. To these ends have been hitherto associated with the constituent carbon of the electrode various compounds of metallic character, for example calcium salts, particularly calcium fluorid, which, though increasing intensity of light, has proved unsatisfactory owing to its giving a reddish color to the arc, especially when the wattage drops below a certain minimum as is unavoidable in commercial installations. To overcome such defects resort has also been had, with more or less indifferent success, to additions to the calcium of other fluorids, *e. g.* sodium fluorids, also borates, rare earths, carbids of boron and of titanium, and even titanium oxid. Even tungstate of calcium has been tried as a substitute for the calcium fluorid or part of it, though this has the disadvantage of being reduced in the arc to metallic tungsten which rectifies the current. But the flaming arcs from the types of electrodes mentioned have hitherto been characterized by undesirable flickering and changes in color.

Prior to my present inventions and those described in my herewith co-pending application, Serial Number 630,545, filed June 1, 1911, the only titanium compound found serviceable for the purpose mentioned on alternating current lines has been, so far as I know, titanium carbid, but this substance, owing to its instability, has proved also undesirable, breaking up in the arc stream into carbon which too quickly burns away and titanium which too rapidly oxidizes.

The object of my present invention is to provide means whereby mineralized carbon electrodes giving flaming arcs may, without impairing their operativeness in alternating currents, develop more efficient, steady, and whiter arcs than heretofore. This object I attain by my improvements as hereinafter described.

My researches have now demonstrated that the mineral additions heretofore made by others to the carbon as heretofore noted cause the electrodes to behave unsatisfactorily in the particulars mentioned largely because of insufficient homogeneity and harmoniousness of behavior and action as regards the physical, chemical, and light-giving properties of the constituting ingredients, and also because of undesirable colors imparted to the arc by such additions. I have now discovered that certain chemical compounds of titanium with certain metals give a substantially white light in the arc and possess such properties as to realize the said objects of my invention, when incorporated into said mineralized carbon electrodes. Any proportion of such compounds so incorporated will produce, proportionally, the beneficial effects referred to, but for industrial purposes I find it preferable to incorporate, as hereinafter noted, a substantial amount of such compound or compounds sufficient to secure the maximum desired effect thereof without unduly impairing those well-known characteristics and behaviors of the electrode which are attributable to its preferably predominating carbon content. As examples of said compounds of titanium with metals, I have found satisfactory for said purpose titanates of the following metals, viz:—Titanate of barium ($3TiO_2,2Ba$), titanate of aluminum ($AlTiO_3$), titanate of magnesium ($MgTiO_3$), titanate of cerium ($CeTiO_3$), and titanate of thorium ($ThTiO_3$), each of said compounds giving a substantially white light in the arc. My best results have, thus far, been attained with barium titanate, but the other titanates mentioned also give sufficiently good results to justify their industrial adoption according to special conditions or requirements of manufacture or use. I have also found that a compound of titanium with the metalloid boron, to wit, borate of titanium ($B_2T_1O_6$) behaves similarly and with substantially equally good results as said titanates, said compound, like the others mentioned, giving a white or substantially white light in the arc.

As above indicated, it is preferable, if not always essential, inasmuch as the compounds mentioned are more or less refractory, to associate therewith, in the electrode, according to the special requirements of each, as determined by the character, and the surrounding conditions, of the particular titanate employed, an additional substance, or substances, primarily for the purpose of acting as fluxes during arcing. Such substances should be selected with a view to their imparting the least possible of undesirable color, or of dimness, to the arc. To this end I employ such quantities of such flux or fluxes as convenience or test may, in each case, determine to be best adapted for the purposes required. I have found suitable for this purpose fluorids of the alkali metals, fluorids of the metal of the titanate employed other than titanium, halogen compounds of titanium, rare earths such as oxid of cerium or oxid of thorium, etc., the use of such fluxes being accessory to my present invention which, in its broadest aspects, consists in utilization, in arc electrodes, as aforesaid, of chemical compounds of titanium with metals, which compounds give a substantially white light in the arc.

Inasmuch as the extent and nature of the fluxes referred to may be more or less varied in each case according to circumstances, or convenience, it is impossible to predicate any hard and fast rules for their use which within the limits aforesaid will be readily determined by those skilled in the art, without further information than imparted by the foregoing and the examples of kind and proportion hereinafter given.

The superior efficiency and other desired qualities of my electrodes are, I believe, attributable not only to their novel ingredients as above stated, but also to my manner of associating these with each other and with carbon in the electrode whereby homogeneity is increased. I therefore prefer to produce, preliminarily, an intimate homogeneous cohesive mixture of the said ingredients as follows:—I have, for example, in a case in which barium titanate was employed as aforesaid, taken by weight of barium titanate ($3TiO_2,2Ba$) 170 parts, of barium fluorid ($BaFl_2$) 100 parts, of cerium oxid (CeO) 100 parts, of potassium titanofluorid (KTiFl) 48 parts, of thorium oxid ($ThO_2$) 2 parts, of sodium fluorid (NaFl) 100 parts. These ingredients being finely powdered, I have thoroughly mixed together with 1439 parts of powdered calcined carbon. To this mixture I have imparted the coherence of stiff paste, by adding thereto and mixing therewith a suitable binder such as tar or a solution of sugar. The resulting product was then applied in the well known manner as coring material to fill the bores of usual electrode skeletons composed of pure carbon and the so cored electrodes dried at 200° to 300° C. to constitute one form of my said improved electrode.

Even more perfect homogeneity may be secured, and I prefer this in every instance, by preliminarily fusing the aforesaid mixture of barium titanate and other minerals into a completely homogeneous mass. Said mass is then pulverized in any convenient manner, the resulting powder thoroughly mixed with powdered carbon, coherence imparted by mixing with any suitable binder, the bores of the skeleton electrode filled with the resulting product and the whole dried as before.

It will be understood that my electrode may, though unpreferably, be composed entirely of my mixture comprising as aforesaid, barium titanate and suitable mineral fluxes mixed with a binder and sufficiently dried, or even fused together or treated in any other well known way to impart thereto requisite mechanical strength, but in such case the proportion of carbon content should be increased so as to constitute a preponderance of carbon in the electrode. In fact I prefer that the carbon should constitute in the neighborhood of two-thirds of the electrode taken as a whole. The total percentage of carbon which I deem most satisfactory in results is from 70 per cent. to 60 per cent. of the whole electrode.

It will be understood that my electrode, in cases in which titanates of metals giving a white light to the arc other than barium titanate are employed, as for instance the other titanates, or the borate of titanium above referred to, are produced in substantially the same manner and proportions and associated with the same fluxes as in the case of barium titanate, the only substantial difference in procedure being that the titanate of the particular metal employed is substituted for the barium titanate and preferably the fluorid of said metal for the barium fluorid, but, as aforesaid, it will be understood that other fluxes than those enumerated in the foregoing example may be, in whole or in part, employed without departing from my invention.

Referring to the accompanying drawings, Figure 1 is a view partly in elevation and partly in central longitudinal section of one form of my electrode; Fig. 2 a transverse section on line 2—2 of Fig. 1; Fig. 3 a view similar to Fig. 1 of another form of my electrode; Fig. 4 a transverse section on line 4—4 of Fig. 3; Figs. 5 and 6 similar views of another form of my electrode.

Similar reference characters indicate similar parts.

$a$ indicates my aforesaid homogeneous mixture comprising one of the titanates specified, carbon and a suitable flux.

$b$ indicates the shell of carbon, constituting the skeleton above referred to, which is, in this instance, of cylindrical type having its bore cored with my said mixture $a$. $c$ indicates another type of carbon skeleton multi-bored and multi-cored with my said mixture.

In the claims where mention is made of a metal which gives a substantially white light in the arc, it will be understood that metalloids which give a substantially white light in the arc, as hereinbefore explained, are embodied within the scope of the claims.

Having thus described my invention, what I claim as new and desire to secure by Letters Patent is the following, viz:—

1. An arc light electrode comprising a preponderance of carbon, and a titanate of a non-ferruginous metal which gives a substantially white light in the arc.

2. An arc light electrode comprising at least sixty per cent. of carbon, and a titanate of a non-ferruginous metal which gives a substantially white light in the arc.

3. An arc light electrode comprising a preponderance of carbon, and a titanate of barium.

4. An arc light electrode comprising at least sixty per cent. of carbon, and a titanate of barium.

ISADOR LADOFF.

Witnesses:
H. M. McKough,
M. C. Bixby.